United States Patent [19]

Sikorra

[11] 4,065,189

[45] Dec. 27, 1977

[54] MAGNETICALLY SUSPENDED ANGULAR MOMENTUM WHEEL

[75] Inventor: Daniel J. Sikorra, Belleair, Fla.

[73] Assignee: Honeywell Inc., Minneapolis, Minn.

[21] Appl. No.: 622,324

[22] Filed: Oct. 14, 1975

[51] Int. Cl.$^2$ .............................. F16C 39/00
[52] U.S. Cl. ...................... 308/10; 244/166
[58] Field of Search ............ 308/10; 310/44, 156, 310/168; 74/5.6, 5.6 A, 5.6 D, 5.46, 5.7; 244/166

[56] References Cited

U.S. PATENT DOCUMENTS

| | | | |
|---|---|---|---|
| 3,411,059 | 11/1968 | Kaiwa | 310/156 |
| 3,480,811 | 11/1969 | Grosbard | 308/10 |
| 3,490,816 | 1/1970 | Lyman | 308/10 |
| 3,650,581 | 3/1972 | Boden | 308/10 |
| 3,746,407 | 7/1973 | Stiles | 308/10 |
| 3,845,995 | 11/1974 | Wehde | 308/10 |
| 3,872,334 | 3/1975 | Loubier | 310/44 |
| 3,877,761 | 4/1975 | Boden | 308/10 |
| 3,888,553 | 6/1975 | Wehde | 308/10 |
| 3,890,019 | 6/1975 | Boden | 308/10 |

Primary Examiner—R. Skudy
Attorney, Agent, or Firm—Albin Medved

[57] ABSTRACT

A momentum wheel wherein friction has been substantially eliminated by replacing mechanical bearings with a magnetic suspension. The rotor of the momentum wheel, in the form of a circular disk whose diameter greatly exceeds its thickness, is maintained in suspension, free of physical contact with the housing, by means of magnetic fields applied between the circular flat surfaces of the rotor disk and a pair of stator plates. The rotor is passively restrained in the radial direction by means of permanent magnets, while an active axial restraint is provided by a combination of permanent magnets and electromagnetic windings.

6 Claims, 9 Drawing Figures

MAGNETICALLY SUSPENDED ANGULAR MOMENTUM WHEEL

BACKGROUND OF THE INVENTION

1. Field of the Invention

The invention relates to the field of devices for controlling the attitude of a vehicle, such as a satellite.

2. Description of the Prior Art

Angular momentum exchange control is ideal for space applications because it can be powered from transformed solar energy and which, therefore, is more applicable to long life missions than one relying solely on stored fuel or cold gas storage. Prior art designs of angular momentum exchange devices, however, have a life limited by wheel bearings and lubrication. Magnetic bearings have been proposed in the prior art, such as for example U.S. Pat No. 3,490,816 to Lyman, suggesting a journal bearing design, wherein the assembly consists of two such bearings suspending a shaft with a flywheel between the bearings. The volumetric efficiency of such approach is not optimal and balancing is a dynamic as well as a static problem.

SUMMARY OF THE INVENTION

The present invention relates to a magnetically suspended angular momentum wheel. Momentum wheels are designed to exchange angular momentum with a vehicle and are particularly useful in spacecraft for attitude control. The advantage offered by a magnetically suspended momentum wheel is that it provides high reliability over an extended period of time. The utilization of magnetic suspension reduces the frictional forces acting on the wheel, thereby extending the life and the reliability of the momentum wheel.

A magnetically suspended wheel according to the present invention offers the advantages of an almost unlimited life, having an ideal adaptability to zero G and hard vacuum environment and a high reliability made possible by the fact that it eliminates mechanical joints, bearings, and lubrication systems. Because the magnetic momentum wheel according to the present invention has flat surfaces, the critical tolerances are easily achieved. The device can be made internally redundant with a single rotor and offers weight advantages, especially where redundancy is required. Because it provides vehicle angular rate data about axes normal to the rotational axis, it can also be used as a rate gyro. The elimination of the ball bearings eliminates ball bearing induced noise or spacecraft jitter which is normally caused by ball bearing vibration. Although the magnetically suspended momentum wheel is not totally free from jitter, it offers the potential of low vibration operation desirable for applications such as space borne telescopes or scanners.

The magnetic momentum wheel according to the present invention is unique in that it does not have a central hub. The rotor, having the shape of a flat disk, is suspended directly at its surfaces. Permanent magnetic rings provide full radial support and have no influence on spin axis alignment. Position along the spin axis and the spin axis orientation is under active electronic servo control and is accurate regardless of external translation or precessional forces. Because of the high aspect ratio of the rotor, a static balance is considered acceptable for dynamic condition as well. Rate information for the two axes normal to the spin axis can be derived from the momentum wheel by monitoring the active axial rebalance currents which are generated for the active axial suspension. This capability of providing the rate information could eliminate the need for rate gyros during on-orbit operation and can be used as a source of rate data for the orbital changes which may be required for some missions.

In the preferred embodiment, the angular momentum wheel, is in the shape of a cylinder 16½ inches in diameter and 1½ inches in length. The total weight of the unit is 25 pounds. The basic components of the momentum wheel assembly are a circular rotor in the shape of a thin disk approximately 15½ inches in outside diameter and ½ inch in thickness, a stator comprised of two parallel flat plates for retaining the rotor between the two of them, including permanent magnets and coils mounted on the stator and permanent magnets mounted on the rotor. The weight of the rotor is 8.1 pounds and the weight of the entire assembly including the rotor, the stators, is less than 25 pounds. The angular momentum generated by the wheel at 6000 rpm is 40 ft-lb-sec.

Radial rotor support is provided by means of permanent magnets and is effective in any radial direction. While the radial support is passive, active support is required along the axial direction of the rotor. The active support is implemented with a four quadrant inductive gap sensor and four electronic servo channels generating magnetic centering forces. The two stator plates form the end members of a cylindrical housing within which the rotor is suspended.

It is therefore an object of the present invention to provide a momentum wheel for spacecraft attitude control with extended, maintenance-free operational life.

DESCRIPTION OF THE PREFERRED EMBODIMENT

Figure 1A:
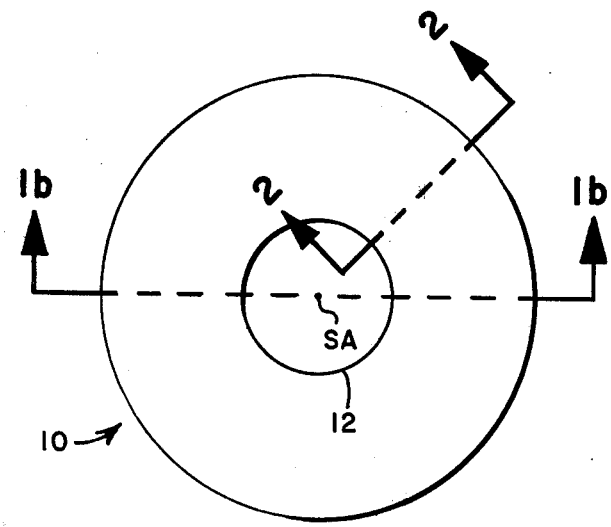
FIGS. 1a and 1b represent a magnetically suspended wheel assembly according to the present invention.
Figure 1B:
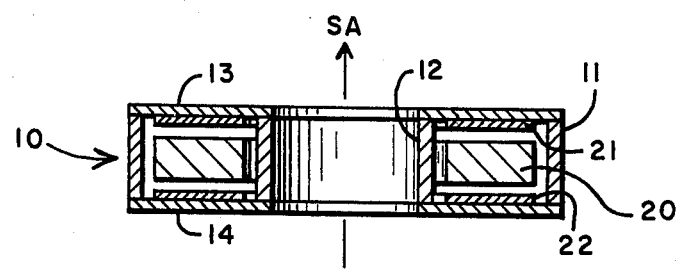

Referring now to FIG. 1, a preferred embodiment of the present invention is illustrated having a housing 10 defined by a larger diameter cylindrical wall 11 and a smaller diameter cylindrical wall 12 joined by a pair of circular end plates 13 and 14. A rotor 20 is shown, between stator members 21 and 22, mounted for rotation about spin axis SA. A cross-section of the preferred embodiment of FIG. 1, taken along plane 2—2, is shown in FIG. 2.

Figure 2:
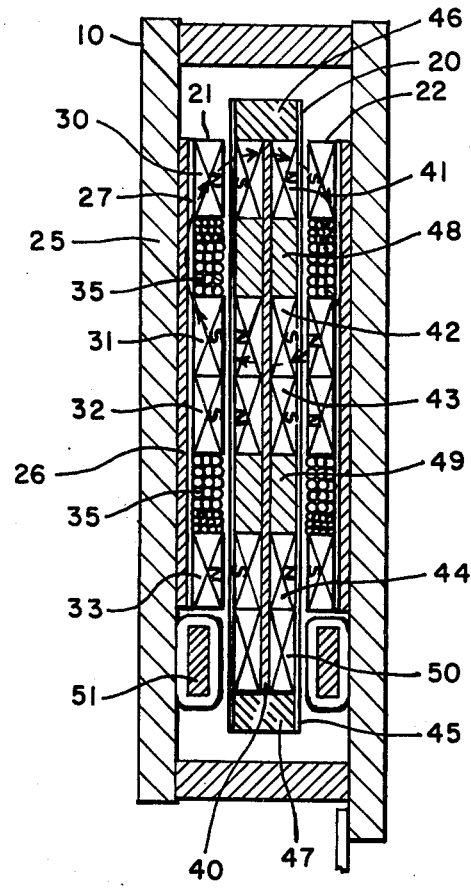
FIG. 2 shows in detail a cross-sectional view of the momentum wheel according to the present invention.
Figure 3:
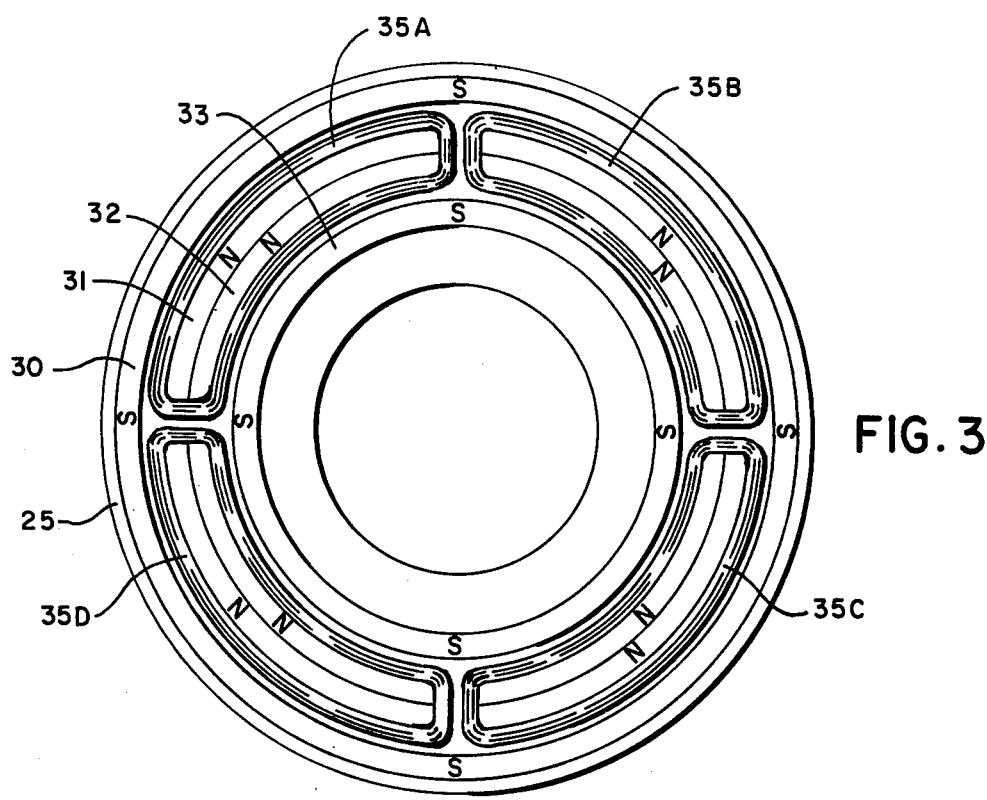
FIG. 3 illustrates a stator assembly for use in the apparatus of FIG. 2.

The magnetically suspended angular momentum wheel according to the present invention will be more clearly understood by referring to FIG. 2, where a rotor 20 (shown in further detail in FIG. 4) is shown mounted within housing 10 between a pair of stator members 21 and 22 (shown in further detail in FIG. 3). Rotor 20 is suspended between stator members 21 and 22 by means of magnetic fields. Stator member 21 includes a circular base plate 25, to which is fastened a circular sheet of steel 26 and to which, in turn, is laminated a thin circular sheet of aluminum 27. Base plate 25 can also serve as part of housing member 11 (see FIG. 1). Aluminum sheet 27 is the base surface for four concentric permanent magnets 30, 31, 32, and 33. The permanent magnets may be constructed of barium ferrite permanent magnet material in a nitrile rubber binder which is flexible and can be readily formed into circular shape and bonded to the steel-aluminum laminate. Interspersed between concentric magnet rings 30–33 are electric windings 35.

Stator member 22 is a mirror image of stator member 21, the two stators being otherwise identical. To avoid congestion in the drawing, the reference numerals associated with each stator are also used to identify the corresponding parts of the other stator.

Rotor 20 has an external appearance of a solid disk with a central circular opening. It consists of a central plate 40 of nickel-iron with four concentric single polarity axially magnetized permanent magnet rings 41, 42, 43, and 44 bonded to each side. The four magnet strips on each side of central plate 40 are aligned with the corresponding four concentric magnet strips on the adjacent stator. An aluminum sheet 45 forms the outside surface on each side of rotor 20. Aluminum stress rings 46, 47, 48 and 49 are provided to retain magnet rings under conditions of high angular speed. Each side of rotor 20 further has a fifth concentric magnet ring 50 comprised of 24 alternately poled segments. Magnet ring 50 is the innermost magnet ring and performs a drive function by which rotational motion may be imparted to rotor 20. Mounted on each stator, adjacent to the innermost magnet ring 50 of rotor 20, is motor stator assembly 51 comprised of windings wound on a nickel-iron core. The four outer magnet rings of the rotor and the stators perform a support function.

Each stator (21 and 22) has mounted thereon four axial drive coils 35A, 35B, 35C, and 36D, as shown in FIG. 3. The four axial drive coils are interspersed between the concentric magnet rings 30–33. The four axial drive coils divide each stator into four quadrants, each of which contains two complete primary magnetic flux circuit paths. This can be most easily visualized at the cross-sectional view illustrated in FIG. 2. Each complete magnetic circuit consists of eight additively (N to S to N to S, etc.) polarized permanent magnet paths wherein the resultant flux bridges the gaps between rotor 20 and stators 21 and 22 in four different areas. As such, the rotor spin axis tends to be passively centered on the axis of the stators and the minimum gap energy condition occurs with the permanent magnets of the stators and the rotor aligned. Any deviation (orthogonal to the rotor spin axis) from this position results in a radial recentering force gradient.

When the gaps between rotor 20 and stators 21 and 22 are equal, the attracting forces generated by the permanent magnets 30–33 are also practically equal and opposite. However, without active control, rotor 20 will move to one stator or the other. That is, the rotor is positionally bistable. This behavior is governed by the difference of the inverse square law characteristic of stator rotor magnetic attraction. The total effective gap on each side of rotor 20 is equal to the sum of the physical separation between the rotor and the stator, the thickness of aluminum plate 45 on the rotor and aluminum plate 26 of the stator.

Figure 5:
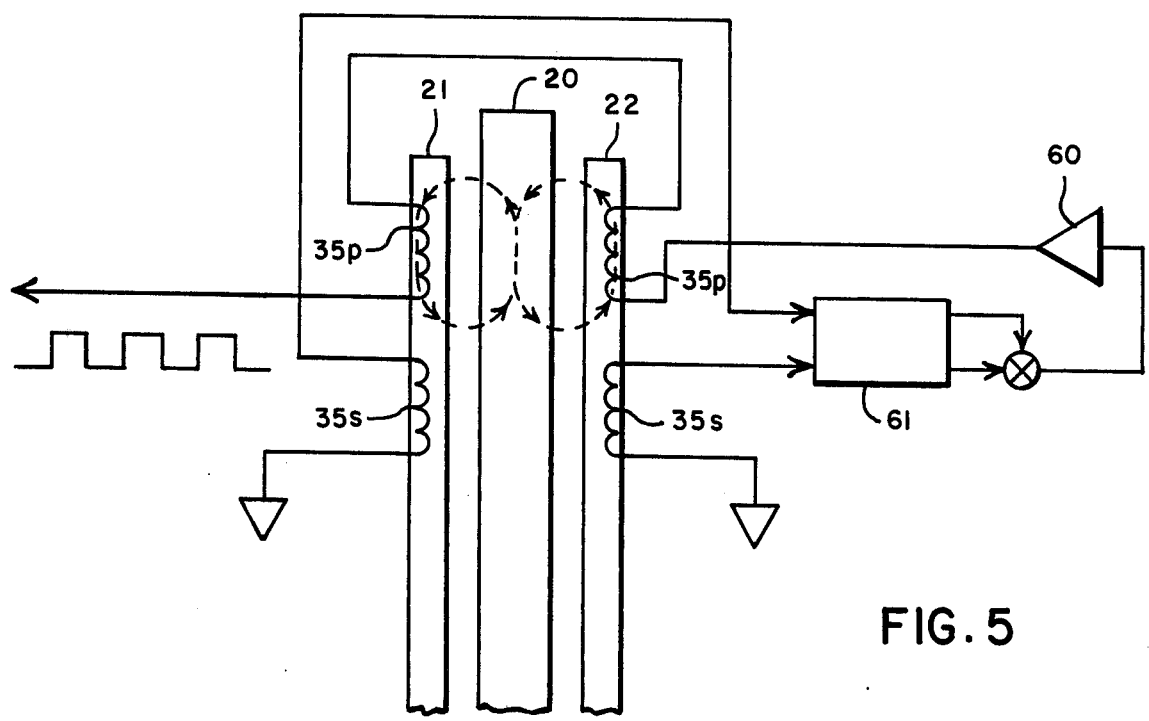
FIG. 5 is a functional diagram of rotor position sensing and control apparatus.

What has been described as one magnetic circuit consisting of four gaps and eight permanent magnet rings is only true when the gaps are all equal. When the gaps are unequal, a differential flux flows through central steel plate 40 of the rotor, accentuating the passive bistable characteristics of the stator-rotor combination. To provide a centering force to rotor 20, flux is added to the flux generated by the permanent magnet in one gap and subtracted from the flux generated by the permanent magnet in the other gap. The differential flux flows through central plate 40. This is accomplished by driving a current through opposite, series-connected, stator coils 35 in each quadrant in response to an error signal generated by off-center position of rotor 20. FIG. 5 illustrates a functional diagram of rotor position control.

The function of drive coils 35 is to maintain equal gaps in each of the four quadrants, despite outside forces from orientation and vibration, or precessional force couples. Axial translational forces are rebalanced by simultaneously additive quadrant currents. Precessional forces are rebalanced by subtractive torquing forces from two quadrants at 180° relative positions.

Coil 35 consists of a primary drive winding and a secondary position sensing winding, illustrated in FIG. 5 as windings 35p and 35s, respectively. Drive winding 35p carries a DC current output of servo amplifier 60, as may be required to maintain rotor 20 centered against external forces. It also carries a 13 KHz modulation, setting up an AC flux which is contained between aluminum plate 26 in the stator, and aluminum face plate 45 of the rotor (see FIG. 2). The primary inductance and the coefficient coupling between primary and secondary windings 35p and 35s is reduced when the rotor to stator gap is reduced. The differential 13 KHz signal from opposite stator sides in any one quadrant is demodulated as a rotor position error signal and amplified by amplifier 60 to provide the drive current to windings 35p.

Figure 6:
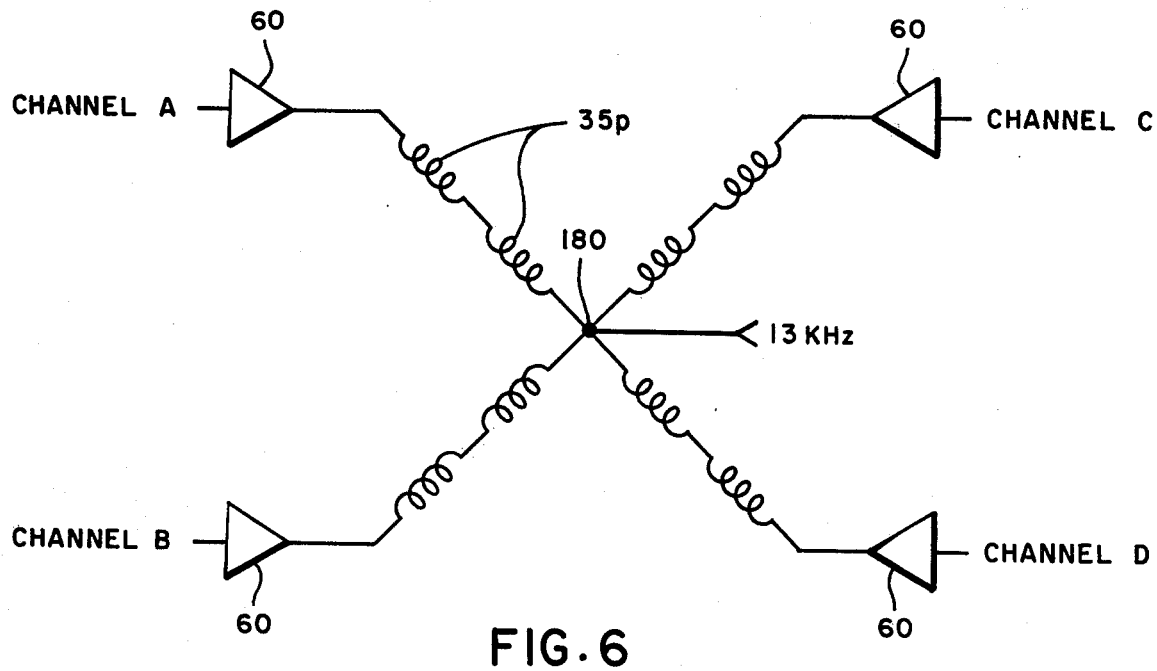
FIG. 6 is a schematic diagram of the suspension servo, illustrating the four channels of suspension.
Figure 7:
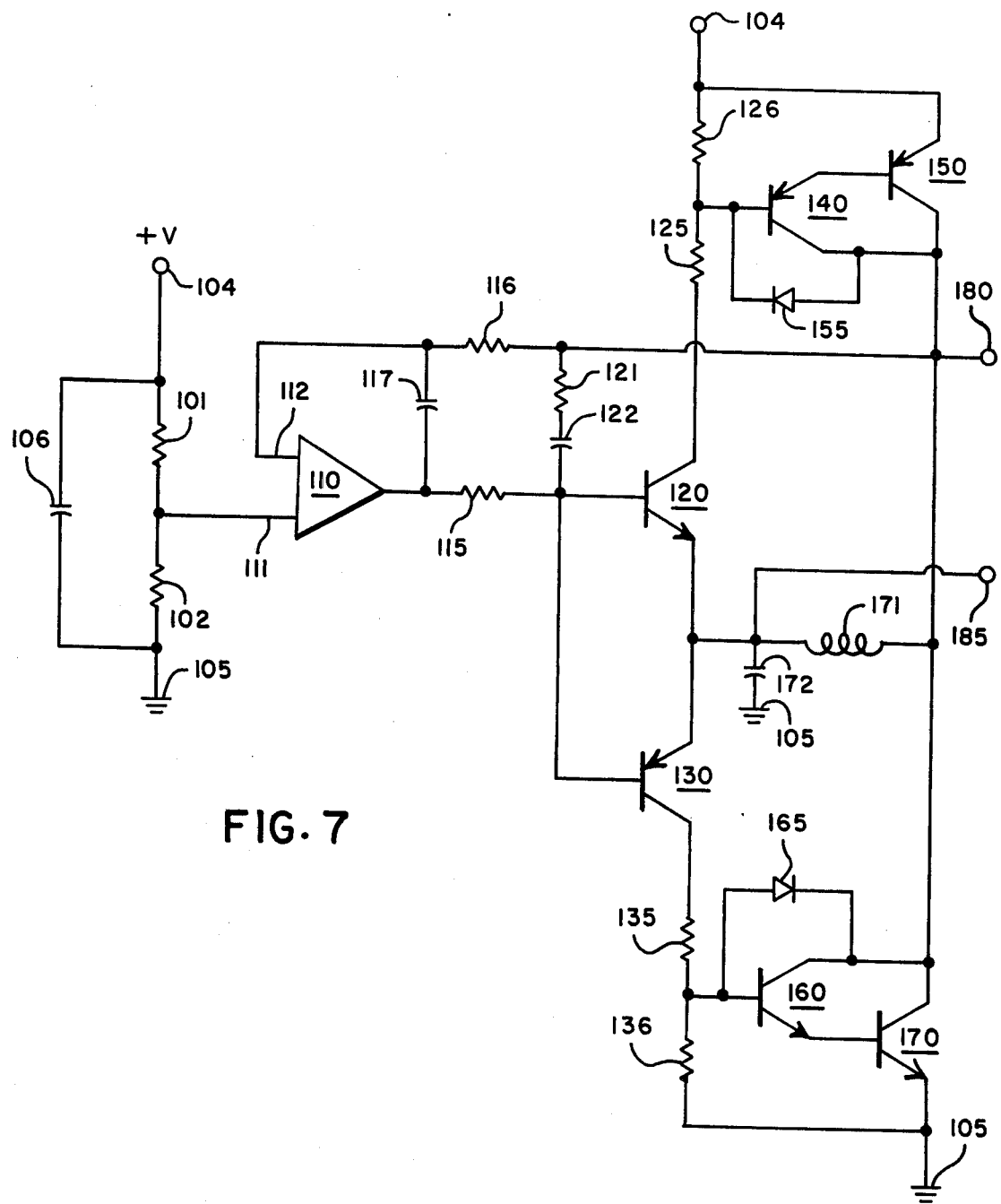
FIG. 7 is a schematic diagram of a circuit for generating an AC excitation signal and a DC signal reference for the four suspension channels.
Figure 8:
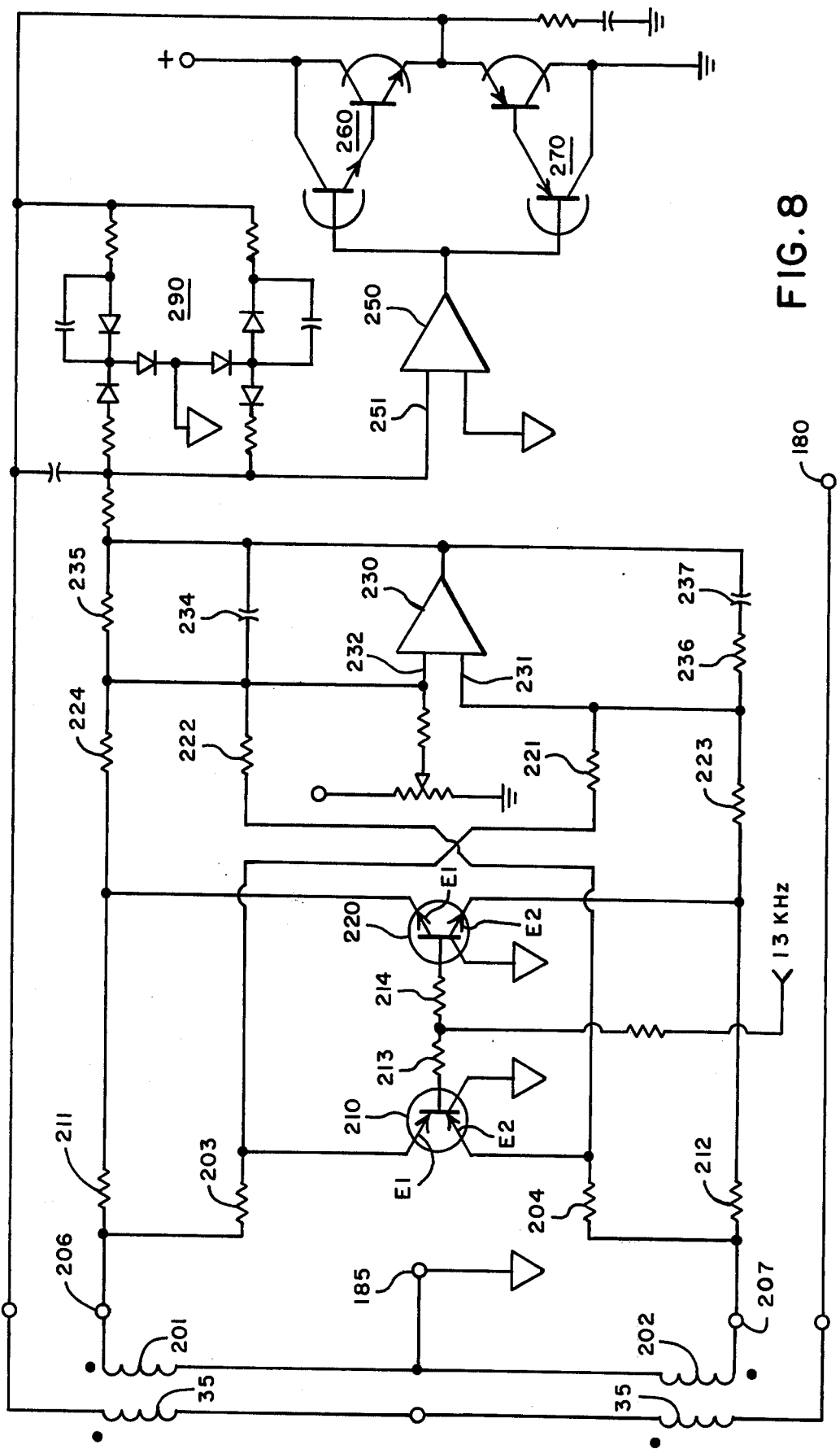
FIG. 8 is a detailed schematic diagram of one of four servo channel electronics.

Schematic diagrams for the electronic circuitry associated with the suspension servo of the preferred embodiment are shown in FIGS. 6, 7, and 8. In FIG. 6, four suspension channels are shown, each including an amplifier 60, having its output connected to energize a pair of series connected suspension windings 35. The other ends of series connected windings 35 of each of the four channels A–D are connected to a common junction point 180. The two windings 35 associated with each channel are physically located on opposite sides of rotor 20, as shown in FIGS. 2 and 5.

The power conditioner circuit of FIG. 7 establishes a reference DC potential which is 50% of the available DC supply source and generates an AC signal for the position sensing coils and choppers of the four channels. A pair of resistors 101 and 102 are connected in series between a positive potential source 104 and ground terminal 105. A capacitor 106 is connected in parallel with resistors 101 and 102. An operational amplifier 110 has a non-inverting input 111 and an inverting input 112. Non-inverting input 111 is connected to the junction point between resistors 101 and 102 to receive a voltage input equal to one-half the supply voltage. The output of operational amplifier 110 is connected through a resistor 115 to the bases of transistors 120 and 130 and also to inverting input 112 through a capacitor 117. The emitter of transistor 120 is connected directly to the emitter of transistor 130, while the collector of transistor 120 is connected through a resistor 125 to the base of a transistor 140. The base of transistor 140 is connected to the source of positive potential 104 through a resistor 126. The emitter of transistor 140 is connected to the base of a transistor 150, while its collector is connected directly to the collector of transistor 150. The emitter of transistor 150 is connected to positive potential terminal 104, while its collector is connected to an output terminal 180. A diode 155 is connected between the collector and the base of transistor 140, the diode being oriented for forward current flow from the collector to the base.

The collector of transistor 130 is connected to the base of a transistor 160 through a resistor 135. The base of transistor 160 is connected to the group potential terminal 105 through a resistor 136. A diode 165 is connected between the base and the collector of transistor 160, the diode being oriented for forward current flow from the base to the collector. The collector of transistor 160 is further connected directly to the collector of a transistor 170, whose base is connected to the emitter of transistor 160 and whose emitter is connected directly to ground potential terminal 105. The collector of transistor 170 is further connected directly to the collector of transistor 150 and to output terminal 180.

A feedback loop is provided from output terminal 180 to the inverting input 112 of operational amplifier 110 through a resistor 116. Output terminal 180 is also connected to the bases of transistors 120 and 130 through a series combination of a resistor 121 and a capacitor 122. The emitters of transistors 120 and 130 are connected directly to an output terminal 185, which in turn is connected to output terminal 180 through a filter network comprised of a reactor coil 171 and a capacitor 172. Reactor coil 171 is connected between output terminals 180 and 185 and capacitor 172 is connected between output terminal 185 and ground terminal 105.

Operational amplifier 110 functions as a linear integrator and a triangle wave generator. The triangle peak is the trigger point at which the integrator output current exceeds the positive feedback current from the square wave output appearing at output terminal 180 and switches transistors 120 and 130 at a basic frequency rate.

When transistor 120 is conducting, transistors 140 and 150 are also conducting and the potential at output terminal 180 approaches the potential of the positive source 104. The feedback from output terminal 180, through resistor 116 to the inverting input 112 of amplifier 110, causes the output of amplifier 110 to integrate in the negative direction. In due time, the potential at the output of amplifier 110 reaches a sufficiently negative value to cancel the positive current flowing into the base of transistor 120 through resistor 121 and capacitor 122. When this occurs, transistor 120 is turned off, also turning off transistors 140 and 150. At the same time, transistor 130 is turned on by a negative voltage appearing at its base, in turn causing transistors 160 and 170 to conduct and causing output terminal 180 to approach the voltage of reference potential terminal 105.

During the second half of the cycle the reverse condition occurs. The output of amplifier 110 produces a positive going ramp which eventually overcomes the current supplied to the base of transistor 130 through resistor 121 and capacitor 122. This results in the turning off of transistors 130, 160, and 170 and the turning on of transistors 120, 140, and 150. In the present embodiment, the switching rate of transistors 120 and 130 is approximately 13 kilocycles. At the output terminal 180, therefore, will appear a square wave signal of about 13 kilocycles.

At the other output terminal 185 will appear a DC signal, which is a filtered average of the AC signal at output 180. The filtering is accomplished by reactor coil 171 and capacitor 172. The DC signal is equal to 50 percent of the available supply voltage and is used to establish the DC signal ground reference for the entire suspension electronics.

FIG. 8 is a schematic representation of the electronics for one of the four suspension channels. Windings 201 and 202 are position sensing windings associated with one quadrant. The two windings are connected to each other at a common junction point, which is in turn connected to the DC signal reference terminal 185, provided by the power conditioner circuit of FIG. 7. The other end of winding 201 is connected to a terminal 206 and the other end of winding 202 is connected to a terminal 207. Terminal 206 is connected to an emitter $E_1$ of a dual emitter transistor 210 through a resistor 203 and to an emitter $E_1$ of a dual emitter transistor 220 through a resistor 211. Terminal 207 is connected to an emitter $E_2$ of dual emitter transistor 210 through a resistor 204 and also to an emitter $E_2$ of dual emitter transistor 220 through a resistor 212. The base electrodes of transistors 210 and 220 are connected to each other and to a 13 KHz signal source through a pair of series resistors 213 and 214, while the collectors of the two transistors are connected to the DC signal reference.

Emitter $E_1$ of transistor 210 is connected to a non-inverting input 231 of an operational amplifier 230 through a resistor 221, while emitter $E_2$ of transistor 220 is connected to the same non-inverting input 231 through a resistor 223. Emitter $E_1$ of transistor 220 and emitter $E_2$ of transistor 210 are connected to an inverting input 232 of operational amplifier 230 through resistors 224 and 222, respectively. A capacitor 234 and a resistor 235 are connected in parallel between the output of operational amplifier 230 and its input 232 and a series combination of a resistor 236 and a capacitor 237 is connected between the output of amplifier 230 and its input 231.

The output of amplifier 230 is applied to an input 251 of an amplifier 250. Amplifier 250 has a second input connected to the DC signal reference. The DC signal reference is obtained from output terminal 185 of the power conditioner circuit of FIG. 7. The output of amplifier 250 is applied to the base electrodes of Darlington power transistor pairs 260 and 270, the amplified output of which is connected to energize a pair of primary windings 35, which are the coils establishing the magentic field for the support of rotor 20 between stators 21 and 22. Amplifier 250 and its associated diode network 290 comprise a bipolar capacitive integrator with fast reset of the type described in U.S. Pat. No. 3,381,229.

Dual emitter transistors 210 and 220 comprise a chopper which provides full wave demodulation of the signal received from sensing windings 201 and 202. The resulting DC signal is amplified by amplifier 230 and is applied to the input of operational amplifier 250, which functions as a proportional plus non-linear integrator network. The output of amplifier 250 is applied to a power Darlington emitter follower pair, comprised of transistor pairs 260 and 270. The complementary Darlington's provide DC power to suspension winding 35.

Figure 4:
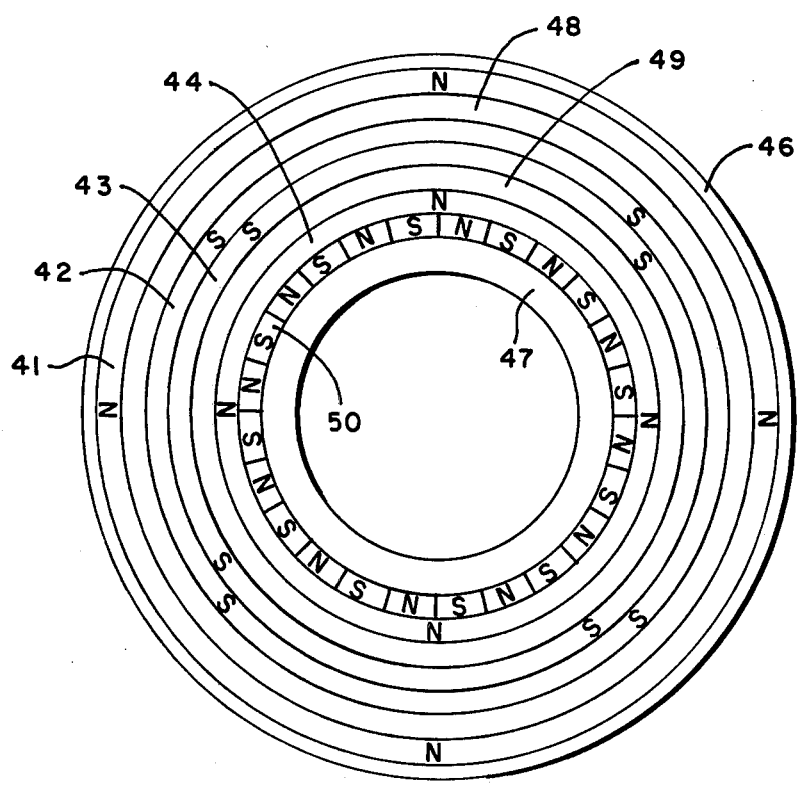
FIG. 4 illustrates a rotor assembly for use in the embodiment of FIG. 2.

Rotational velocity may be imparted to the rotor in a number of different ways, as will be obvious to those skilled in the art. For the highest degree of physical integration and simplicity, it is desirable to incorporate the motor function in a common wheel assembly instead of attaching a separate motor assembly. This is most efficiently done, considering the relatively large axial air gap, by establishing motor-rotor poles with permanent magnets 50 on rotor 20 to interact with moving magnetic fields established in the windings 51 on stators 21 and 22. In one embodiment of the present invention, for example, a simple commutation scheme was utilized. A pair of optical transducers were mounted adjacent to and facing a rotor inner ring which comprised of alternate segments of reflective and non-reflective surface. The segments were applied at 15° intervals, resulting in 24 such segments in the entire ring. As the rotor is spinning, each optical transducer generates a plurality of square waves in accordance with the reflective light from the inner ring of the rotor. The signals from the optical transducers are then amplified and applied to motor windings located on the stators, which in turn interact with the magnetic fields created by permanent magnets mounted on the rotor. The permanent magnets for the rotor drive are shown in FIG. 4 as the inside magnet ring 50, comprised of 24 alternately poled magnet segments.

A unique and improved means of suspending the rotor of a momentum wheel assembly has been shown and described in the foregoing specification. Various modifications of the inventive concept will be obvious to those skilled in the art, without departing from the spirit of the invention. It is intended that the scope of the invention be limited only by the following claims.

What is claimed is:

1. An angular momentum storage apparatus comprising:
    a rotor member in the shape of a circular disk having two parallel flat sides, the diameter of said rotor member being substantially greater than its thickness;
    a pair of stator members each having a flat surface of area substantially equal to the area of one flat side of said rotor member, the two stator members being positioned such that their two respective flat surfaces are parallel and facing each other and are separated from each other by a distance slightly greater than the thickness of said rotor member; and
    means for supporting said rotor member between said stator members free of mechanical contact with said stator members and free for rotation about a spin axis said means for supporting including,
        a plurality of single polarity axially magnetized permanent magnet rings mounted on the flat sides of said rotor member and the flat surfaces of said stator members,
        electromagnetic field generating means mounted on said stator members for generating a differential magnetic field between said stator members and said rotor member,
        position sensing means for detecting the displacement of said rotor from a predetermined position with respect to said stator members and for generating a signal which is a function of said rotor member displacement, and
        means for receiving the signal from said position sensing means and connected to said electromagnetic field generating means to control said magnetic field so as to maintain said rotor member in said predetermined position.

2. Apparatus according to claim 1, wherein said position detecting means includes a magnetic coil for sensing the magnetic reactance within each of the two gaps between the rotor member and the stator members.

3. Apparauts according to claim 1, wherein the permanent magnet is constructed of barium ferrite permanent magnet strips of circular shape, the magnet strips on the rotor being aligned concentrically with the magnetic strips in each of the stator members.

4. Apparatus according to claim 1, wherein the rotor is constructed of a central circular plate of magnetically soft permeable material.

5. Apparatus according to claim 4, wherein said magnetically soft permeable material is nickel-iron.

6. Apparatus according to claim 1, wherein said position detecting means includes a means for generating an alternating magnetic field in the gaps between said rotor member and each of said stator members and further means are provided for detecting the amplitude of said alternating magnetic field in said gaps, said amplitude being a function of the separation between said rotor and stator members.

* * * * *